United States Patent
Stiegemeier

[11] 3,715,716
[45] Feb. 6, 1973

[54] PROGRESSIVE DISPLAY SCREEN

[76] Inventor: Jean R. Stiegemeier, 559 Andes Ave., Orlando, Fla. 32807

[22] Filed: May 13, 1970

[21] Appl. No.: 36,784

[52] U.S. Cl. .................................................340/23
[51] Int. Cl. ..............................................G08g 1/12
[58] Field of Search...........40/106.3, 106.31, 106.41; 340/23, 24

[56] References Cited

UNITED STATES PATENTS

| 2,492,241 | 12/1949 | Schillinger | 40/106.31 |
| 3,190,950 | 6/1965 | Ariessohn | 340/24 |
| 2,920,420 | 1/1960 | Kolodziejski | 40/106.31 |
| 2,434,250 | 1/1948 | Rebus | 40/106.3 |
| 1,329,653 | 2/1920 | Crippen | 40/106.31 |
| 2,810,975 | 10/1957 | Goehring | 40/106.31 |

Primary Examiner—Kathleen H. Claffy
Assistant Examiner—David L. Stewart
Attorney—Duckworth and Hobby

[57] ABSTRACT

A progressive display screen apparatus for indicating the position of a vehicle in which a flexible guide located behind the screen guides an indicator which indicates where the vehicle is located with respect to a referenced map which may be on the screen or a separate topographical map located behind the screen. A variable speed motor, or the like, drives the indicator at a speed analagous to the speed of the vehicle and lights may be provided to illuminate various locations or sections of the map.

10 Claims, 9 Drawing Figures

PATENTED FEB 6 1973

JEAN R. STIEGEMEIER
INVENTOR

By Duckworth & Hobby
Attorney

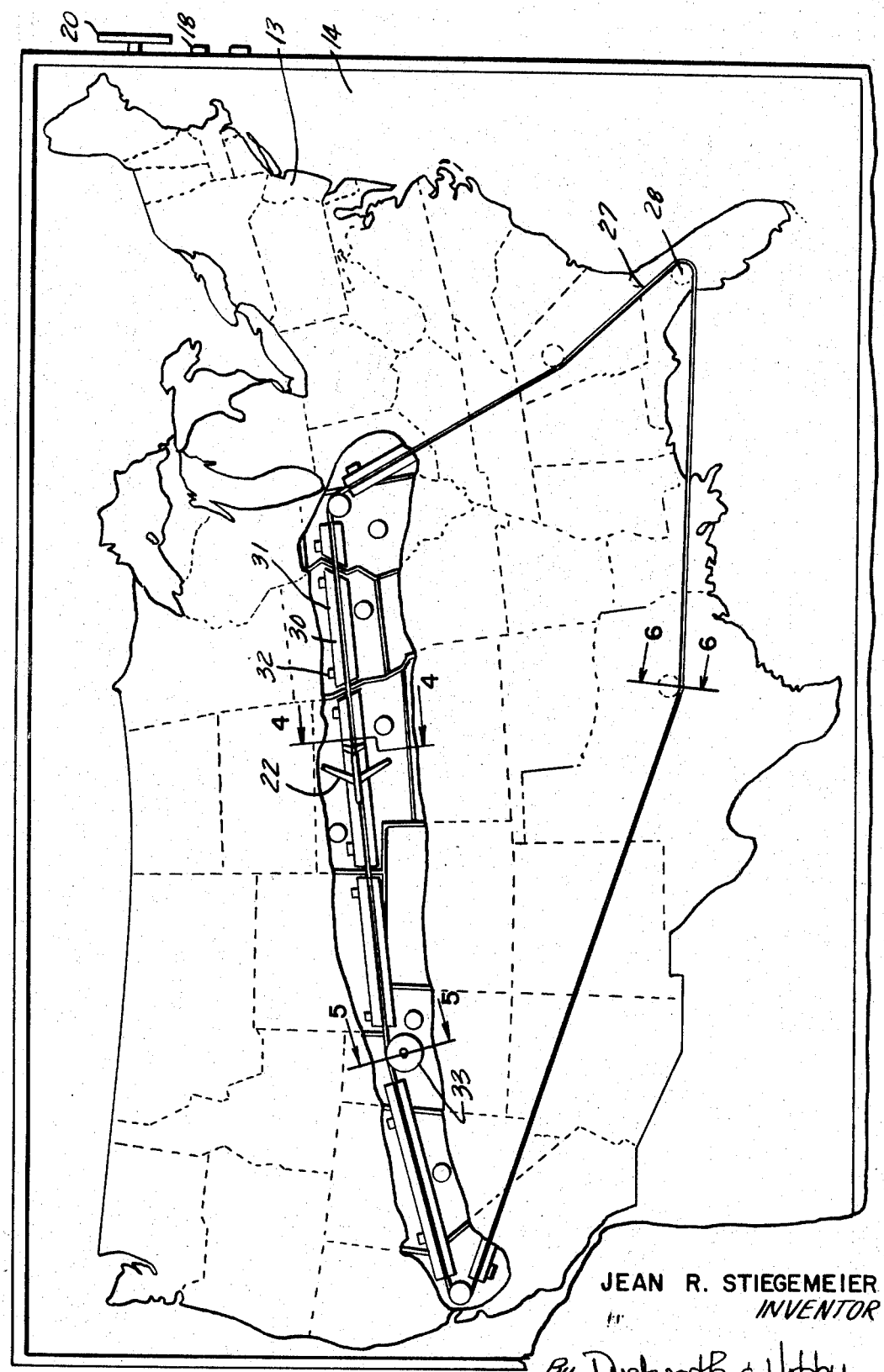

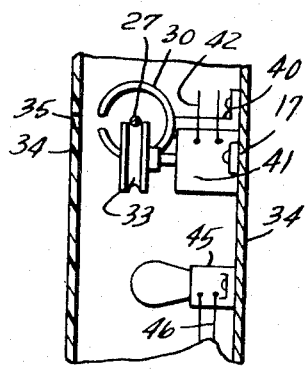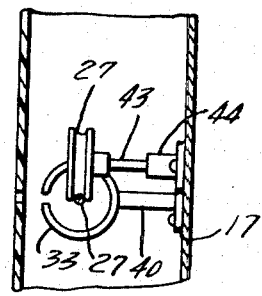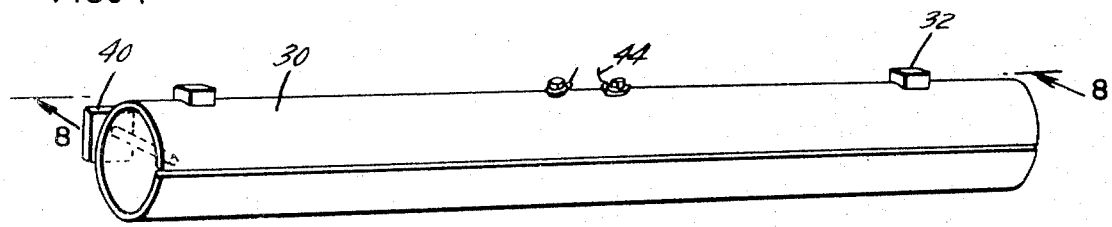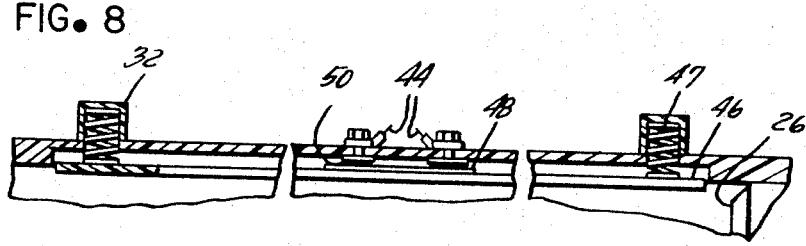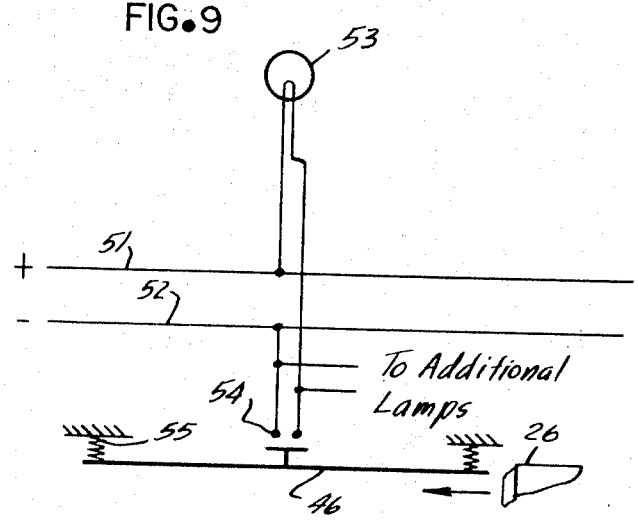

3,715,716

PROGRESSIVE DISPLAY SCREEN

BACKGROUND OF THE INVENTION

The present invention relates to display screens and more particularly to progressive display screens adapted to indicate the position of a plane, train, or other vehicle on a map and especially such a device which is placed on the vehicle and adapted to indicate the position of the vehicle without the exactness required for navigation.

In the past it has been common to have various type of navigation equipment for locating an aircraft, or other vehicles, for use by the pilot to determine his position. These devices are usually of a complex type for utilizing radio beams, for pinpointing the exact position of the plane and displaying this on a set of coordinates or on a map so that the pilot can look at a display board and rapidly visualize where the plane is located at that instant. These devices, however, have to be very accurate for navigation purposes, and pinpoint their positions relative to two or more radio beams or from other fixed points; in addition to the complexity, such units are expensive to build and maintain.

It has been suggested in the past to provide airplanes with various types of screens indicating that the seat belts should be fastened and that smoking was not allowed during various periods, and finally, various types of advertising screens have been provided in which various operations were displayed for advertising purposes but which have not relationship to a device varying in accordance with the location of a vehicle. It has been suggested to provide a screen in train stations indicating the locations of trains along the track so as to determine rapidly when to expect a train to arrive at a station.

Accordingly, it is an object of the present invention to provide a relatively simple device for indicating the position of a vehicle to passengers on the vehicle and which does not get into the complexity of locating the position with the accuracy normally required in navigation.

SUMMARY OF THE INVENTION

The present invention relates to a progressive display screen and especially to a progressive display screen for use in airplanes for indicating to passengers the approximate location of a plane during flight. A screen is provided which displays a map and a position indicator moves along the map to indicate the position of the airplane or other vehicle. The position indicator could for instance be in the shape of an airplane if the display screen is to be utilized on an aircraft and is connected to a guide belt for guiding the indicator along the predetermined route of the vehicle. The position indicator is moved by a variable power source such as a variable speed motor which motor is adjusted to vary the speed that the position indicator moves, which speed would be analagous to the speed of the vehicle. Thus, when so adjusted the position indicator would indicate the position of the plane relative to the actual position of the vehicle. Other features are provided, such as illuminating the indicator or different portions of the map, or lighting up the state or city which is being passed through. The screen may also be provided with a clock indicating the time in the particular time zone and other features or warning lights, as desired.

BRIEF DESCRIPTION OF THE DRAWINGS

Other objects, features and advantages of this invention will be apparent from a study of the written description and the drawings, in which:

FIG. 3 is an enlarged elevation of the embodiment of FIG. 1 with parts broken away;

FIG. 5 is a section taken on the line 5—5 of FIG. 3;

FIG. 6 is a section taken on the line 6—6 of FIG. 3;

FIG. 7 is a diagramatic perspective view of one of the track structures;

FIG. 8 is a sectional view taken on the line 8—8 of FIG. 7; and

FIG. 9 is a wiring diagram illustrating one embodiment of the wiring for the present invention.

DESCRIPTION OF THE PREFERRED EMBODIMENTS

Figure 1:
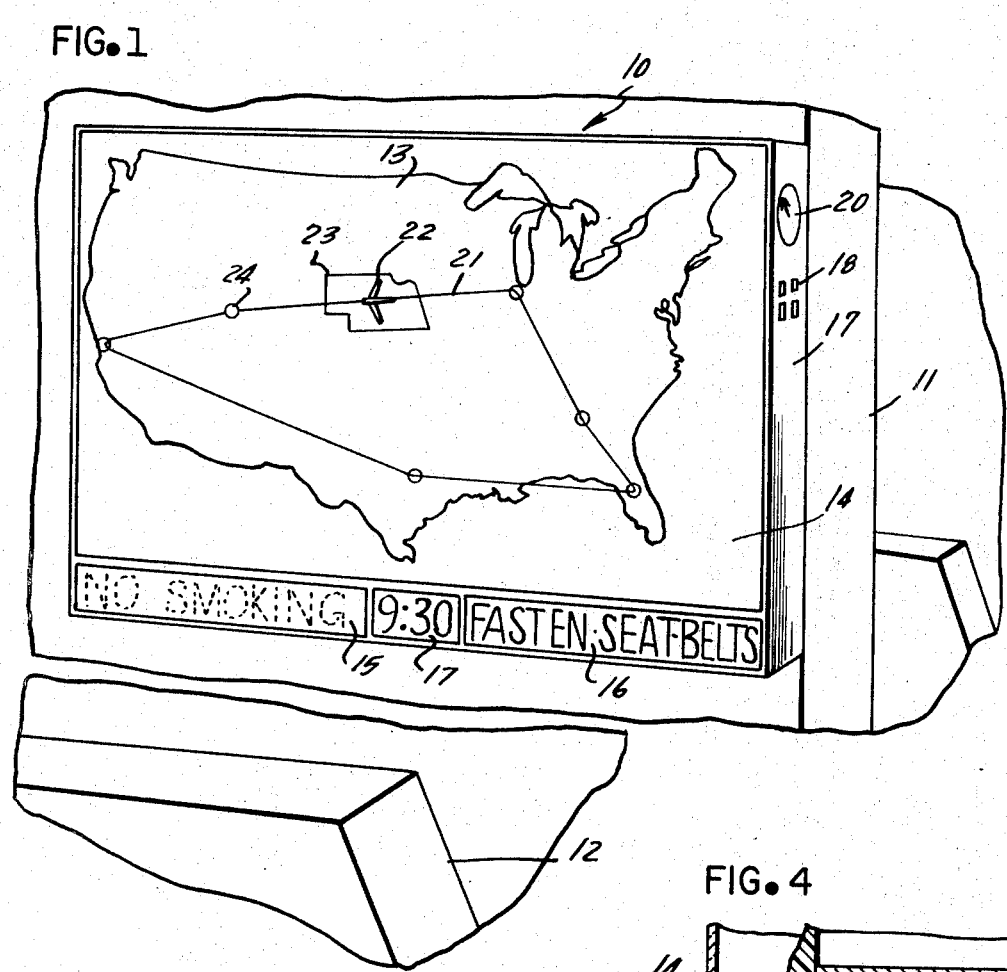
FIG. 1 is a diagramatic perspective of one position indicator.

Referring now to FIG. 1, a perspective of the present invention 10 is illustrated attached to an airplane 11 with passenger seats 12 illustrating a map of the United States 13 shown on the screen 14 of the display device 10. The display device in this embodiment has included a NO SMOKING sign 15, FASTEN SEATS BELTS display 16, and a digital type CLOCK 17 for indicating the time within the particular time zone the airplane is located in. The device 10 is enclosed in a casing 17 with a screen 14 in the front thereof and having a series of switches 18 which may be for turning the unit on or off as well as for turning on the NO SMOKING or FASTEN SEAT BELTS signs. A dial 20 is also indicated in the side of the casing 17 and is used to set the air speed of an airplane or the speed of another vehicle if the screen is located therein.

As can be seen from the screen 14 with a map 13 thereon indicates the route of the plane 21 and has a position indicator 22 which moves along the route 21. The position indicator 22 may be in the shape of a plane or the shape of another type of vehicle for use in that type of vehicle. An area, such as a state, may be separately illuminated to indicate which state the plane is passing through, or alternatively, the cities 24 may be illuminated as each position indicator approaches a city. These illuminations are in addition to the lights that could be used in connection with the position indicator 22 to light up the position indicator as it moves across the map and screen, and the lights for illuminating the entire screen, if desired.

Figure 2:
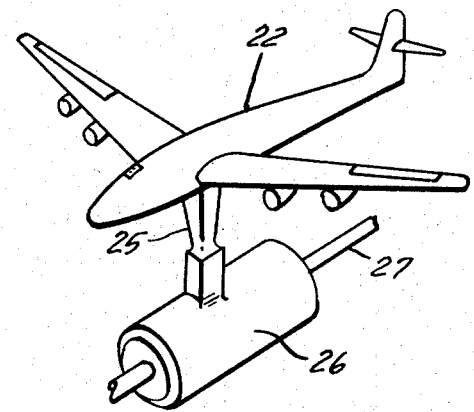
FIG. 2 is a perspective view of the position indicator illustrated as an airplane.

FIG. 2 more clearly shows the position indicator 22 in the shape of an airplane attached to a member 25 which is in turn attached to a holding member 26 showing the shape of a cylinder which cylinder is fixedly attached to a guide 27 but in a manner adapted to be shifted along guide 27 if desired. In the present embodiment, guide 27 is a flexible belt, such as a rubber, and moves over the route of the plane but it will be course be clear that the unit 26 could move along guide 27 which could be fixed, without departing from the spirit and scope of the present invention.

Figure 3 has a screen 14 connected to the casing 17 with a map of the U.S. 13 having the individual states illustrated and also with the speed indicator setting 20 and switches 18 shown connected to the casing 17. The guide belt 27 can be seen connected to rollers 28 which rollers can be located to direct the course of the indicator 22 as desired. It is contemplated by this invention that the rollers 28 can be moved for setting a new route along the map 13 and as will be described in more detail later. Track 30 is adapted for the guide belt 27 to pass through, along with the position indicator 22 and having slot 31 for the position indicator on 25 to pass and have micro switches 32 attached thereto which are activated as the plane reaches a particular state to illuminate that state, and a second micro-switch along that state line can disconnect that illumination prior to the next switch illuminating the next state. These micro-switches 32 could also be positioned to indicate passing over a particular city with the light being shut off as soon as the city is passed. A drive roller 33 is shown, which drives the belt 27 to move the position indicator 22 along its route by the rotation of roller 33 which is frictionally engaged with belt 27. The drive roller 33 may be connected to a variable speed motor whose speed is controlled by the dial 20 which dial 20 drives motor 33 relative to the speed of the vehicle so that the indicator 22 will always be in the approximate position of the vehicle as long as the vehicle is travelling at a constant speed. Variations in speed will of course result in readjustment having to be made with dial 20. Any variable drive means could be used, but a variable speed motor which could be varied, by a potentiometer connected to dial 20 wherein the voltage applied to the motor is varied could be utilized as one simple drive means.

Figure 4:
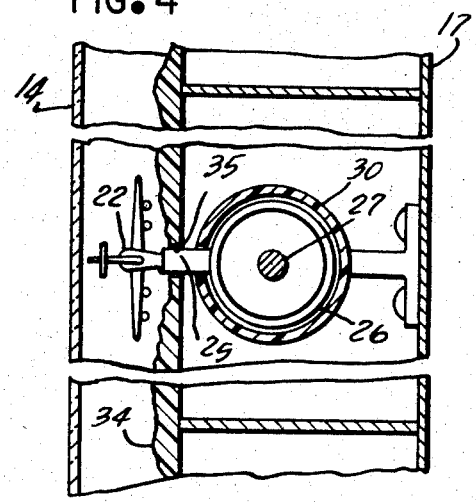
FIG. 4 is a sectional view taken along line 4—4 of FIG. 3.

The embodiment of FIG. 1 illustrates the map 13 outlined on the screen 14, whereas in FIG. 4 a topographical representative 34 is illustrated being attached to the casing 17. Such a topographical map may have raised mountains, lowered valleys, and the like, which are colored various colors to give a more pleasing appearance than would be outlined of a map on the screen. The topographical representation is located inside of the screen 14 but outside of the guide belt 27 riding in the track 30 with the arm 25 passing through a slot 35 in the topographical representation 34 and having the position indicator 22 attached thereto; thus the topographical map 34 can be illuminated to be seen through the screen 14 to provide an esthetically pleasing presentation of the area being travelled over while the plane indicator 22 will provide a three-dimensional effect of the plane flying over the area, and the illumination as described will enhance the visual effect.

FIGS. 5-8 illustrate operation of the track 30, guide belt 27 as attached to the casing 17 behind the topographical representation 34 having a slot 35 therein with track 30 being attached by bracket 40 to the casing 17 and a drive roll 33 connected to a drive motor 41 by electrical conductors, drive motor is attached to the casing 17 while the free running rollers 27 are attached by a rotatable shaft to a bracket 44 which is attached to casing 17. Electrical conductors 44 attached to the track 30 for activating micro-switches or relays 32 which turn on or off the illumination for individual states or cities as the device moves along guide 27.

FIG. 5 specifically shows an electric lamp 45 connected to conductors 46 for illuminating a state or a city and FIGS. 8 and 9 illustrate a second embodiment for activating switches in track 30 by having a plate 46 spring-loaded by springs 47 which is raised by member 26 passing through the track 30 and which has on it a small metal conductor strip 48 which is in turn raised to make contact with contacts 50 which are connected to the conductors 44 for illuminating that particular state or other portion of the map 13.

FIG. 9 is the wiring diagram of the embodiment of FIG. 8 and shows positive and negative conductors 51 and 52 respectively connected to a lamp 53 through a switch 54 which is illustrated as spring-loaded by springs 55 but of course could be operated in different manners as desired, but is shown diagrammatically as having member 26 about to make contact with member 46 to activate the switch 54 for turning on the lamp 53.

At this point, it will be clear to those skill in the art that a screen display device has been provided especially adapted for use on airplanes, but which may also be used on ships, in connection with trains, or the like, and which provides a relatively simple display screen to illustrate the relative position of the route on a map and especially in a desirable or pleasing topographical map which will clearly indicate when mountain ranges are being passed over and adapted for illumination of varying portions of the map. However, this invention is not to be construed as limited to the particular forms disclosed herein since these are to be regarded as illustrative rather than restrictive.

I claim:

1. A progressive display screen for indicating the position of a vehicle comprising in combination:
   a. screen means;
   b. map means located behind said screen means whereby said screen means will display a map to a viewer;
   c. position indicating means for indicating the approximate location of said vehicle on said map means, said position indicating means being adjusted prior to travel for a selected route of a plurality of preset routes which said vehicle can travel; and
   d. speed adjustment means for setting the speed of said position indicating means over said route on said map means, so that said position indicating means will indicate the approximate location of said vehicle on said map means at all times over a route said vehicle is travelling when said speed adjustement is set for a speed analogous to that of said vehicle.

2. The apparatus in accordance with claim 1 in which said position indicating means includes lighting means for illuminating the location of said vehicle on said map means.

3. The apparatus in accordance with claim 1 in which said position indicating means includes guide means having switches located in predetermined position for actuating a second lighting means for illuminating areas on said map means while said position indicating means is passing thereby.

4. The apparatus in accordance with claim 3 in which said position indicating means resembles an airplane in shape.

5. The apparatus in accordance with claim 4 in which said guide means passes through track means having micro-switches thereon for activating said second lighting means.

6. The apparatus in accordance with claim 4 in which said screen includes a clock adapted to indicate the time in the particular time zone said vehicle is located in.

7. The apparatus in accordance with claim 6 in which the map means is a topography representation located behind said screen means;

8. The apparatus in accordance with claim 7 in which the position indicating means passes through slots in said topography representation, said slots following the routes said vehicle is to travel.

9. The apparatus in accordance with claim 7 in which said screen includes NO SMOKING and FASTEN SEAT BELTS displays thereon adapted to be illuminated.

10. The apparatus in accordance with claim 6 in which said map means is a map located on said screen means.

* * * * *